US006002219A

United States Patent [19]

Permuy

[11] Patent Number: 6,002,219

[45] Date of Patent: Dec. 14, 1999

[54] ALTERNATOR USED BOTH AS A GENERATOR AND AS A MOTOR FOR STARTING THE ENGINE OF A SELF-PROPELLED VEHICLE

[75] Inventor: Alfred Permuy, Rueil Malmaison, France

[73] Assignee: Valeo Electronique, Creteil, France

[21] Appl. No.: 08/807,135

[22] Filed: Feb. 27, 1997

[30] Foreign Application Priority Data

Feb. 28, 1996 [FR] France .................................. 96 02463

[51] Int. Cl.[6] ........................................................ H02P 1/00

[52] U.S. Cl. .......................... 318/139; 307/10.6; 180/287

[58] Field of Search ............................ 312/139; 120/287, 120/65.1, 65.2; 307/10.2–10.6; 340/825.3–825.32, 825.34, 825.69, 825.72; 123/179.2

[56] References Cited

U.S. PATENT DOCUMENTS

| | | | |
|---|---|---|---|
| 4,313,080 | 1/1982 | Park | 180/65 A |
| 5,441,122 | 8/1995 | Yoshida | 180/65.2 |
| 5,521,443 | 5/1996 | Imura et al. | 307/10.2 |
| 5,670,934 | 9/1997 | Ina et al. | 340/426 |
| 5,708,307 | 1/1998 | Iijima et al. | 307/10.5 |
| 5,722,502 | 3/1998 | Kubo | 180/65.4 |

FOREIGN PATENT DOCUMENTS

| | | |
|---|---|---|
| 974313 | 9/1975 | Canada . |
| 2722738 | 1/1996 | France . |

*Primary Examiner*—Jonathan Salata

*Attorney, Agent, or Firm*—McCormick, Paulding & Huber

[57] ABSTRACT

A self-propelled vehicle alternator used both as a generator and as an electric motor for starting the engine of the vehicle. A coil-carrying rotor and a multiphase stator connected to a bridge of diodes and switches for rectifying and controlling the phases cooperate for selective operation as a generator or starting motor. A control unit for the switches recognizes a code signal transmitted by a code transmitter and controls the phases of the stator to cause the alternator to operate as an electric motor and start the engine only if it receives a code signal from the transmitter authorizing starting.

5 Claims, 2 Drawing Sheets

ALTERNATOR USED BOTH AS A GENERATOR AND AS A MOTOR FOR STARTING THE ENGINE OF A SELF-PROPELLED VEHICLE

The present invention relates to a self-propelled vehicle alternator used both as a generator and as a motor for starting the engine of the vehicle.

BACKGROUND OF THE INVENTION

Conventionally, the starter motor of a self-propelled vehicle is a DC electric motor designed, on starting, to drive the shaft of the engine, e.g. by means of a sliding pinion that meshes with a driving ring carried by said shaft.

As is known, it is easy to start an engine by driving its starter by short circuiting the vehicle's contactor.

So solve this problem, it is known to fit vehicles with immobilization systems that prevent the engine from being started until an unlocking code signal has been received, e.g. by a computer controlling injection to said engine.

Nevertheless, injection computers are still not widespread, so at present few vehicles are fitted with such immobilization systems.

OBJECTS AND SUMMARY OF THE INVENTION

An object of the invention is to propose another type of immobilization system.

It has been known for a long time that is possible to operate an electricity generator, whether of the dynamo type or of the alternator type, as an electric motor.

In particular, proposals have already been made to use current generators operating as motors to replace engine starters.

As an illustration, reference may be made to French patent application 2,722,738, in which hybrid motors are described including, in addition to the electric motor proper, an alternator mounted on the shaft of the engine. The alternator performs three functions: it serves to brake the electric motor by driving the engine when the vehicle is decelerating; it also performs its conventional alternator function and charges the vehicle battery when it is itself driven by the engine; finally, it serves to drive the engine for the purpose of starting it.

To this end, the rectifier bridge at the output from the alternator winding serves also as a bridge for controlling the phases of the alternator, with each diode being associated with a switch-forming transistor connected in parallel between the cathode and the anode of the diode.

The various transistors of the bridge constituted in that manner are controlled during motor operation using sequences that enable the alternator to be caused to operate as an electric motor.

When the alternator is used as a generator, then the transistors are open circuit and the output current from the alternator is rectified by the diodes.

The invention provides a self-propelled vehicle alternator used both as a generator and as an electric motor for starting the engine of the vehicle, the alternator comprising a coil-carrying rotor and a multiphase stator connected to a bridge of diodes and of switches for rectifying and controlling said phases, together with a control unit for controlling said switches, wherein the control unit includes means for recognizing a code signal transmitted by code transmitter means inside the vehicle, said control unit controlling the phases of the stator for the purpose of starting the engine only if it receives a code signal from said code transmitter means authorizing such starting.

BRIEF DESCRIPTION OF THE DRAWINGS

Other characteristics and advantages of the invention appear further from the following description. The description is purely illustrative and non-limiting. It should be read with reference to the accompanying drawings, in which.

MORE DETAILED DESCRIPTION

Figure 1:
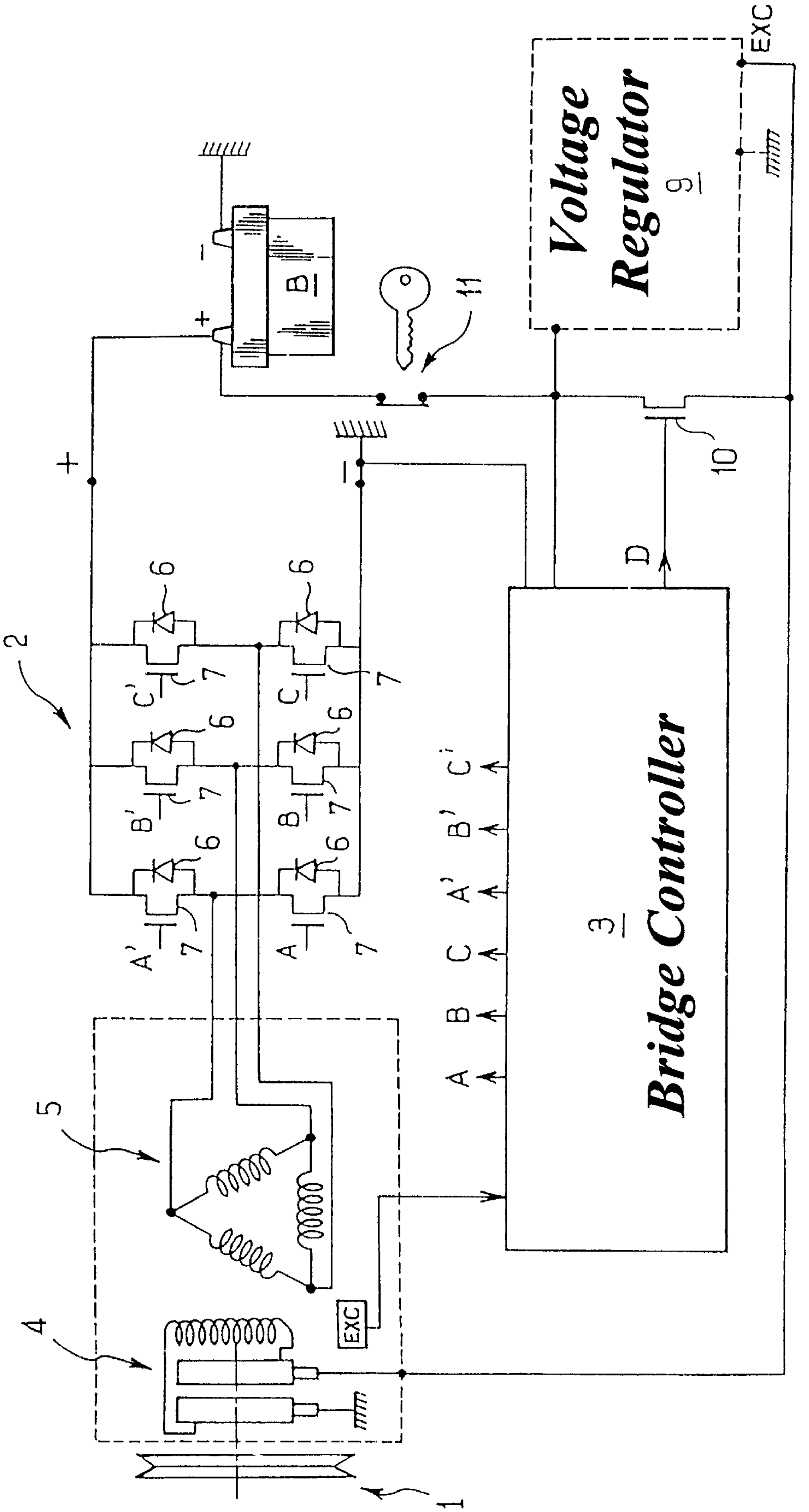
FIG. 1 is a circuit diagram showing an alternator of the invention.

In FIG. 1, a three-phase rotary machine is shown comprising an alternator proper, a control and rectifier bridge 2, and a unit 3 for controlling the bridge 2.

In conventional manner, the alternator-forming rotary machine 1 comprises:

a coil-carrying rotor 4 constituting the primary magnetic circuit associated with two rings and with two brushes that convey excitation current (of the order of a few amps); and a stator 5 carrying a plurality of coils constituting the secondary magnetic circuit, connected in star or delta configuration in the common case of a three-phase structure and acting, during alternator operation, to deliver converted electrical power to the rectifier bridge 2 (several tens of amps at a voltage of the same order as the battery voltage).

The bridge 2 is connected to the various phases of the secondary magnetic circuit 5 and is connected between ground and a power supply terminal of the battery B of the vehicle. It is constituted by a plurality of diodes 6 forming a rectifier bridge, and also by a plurality of switches such as transistors 7 that are connected in parallel with respective diodes 6 and which control the various phases of the alternator.

In motor mode, the diodes act as freewheel diodes, whereas in generator mode, they act as a rectifier bridge.

The transistors 7 are advantageously MOSFET type transistors. It will be observed that said transistors include, by construction, a diode between drain and source. Consequently they enable the rectifier and phase control bridge 2 to be implemented using transistor components only which then act both as switches and as freewheel diodes.

Motor mode operation of such an alternator is achieved by imposing DC on the primary magnetic circuit 4 and by delivering signals that are phase-shifted by 120° to the phases of the stator, which signals are ideally sinewave signals, but may optionally be squarewave signals or trapezoidal wave signals.

Figure 2A:
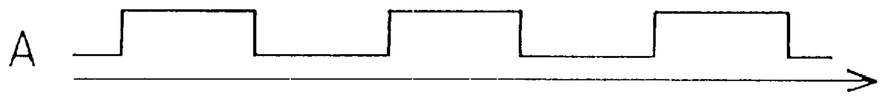
FIGS. 2*a* to 2*d* show a control sequence for motor operation of the FIG. 1 alternator.
Figure 2B:
Figure 2C:
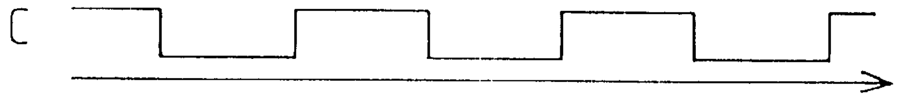

FIGS. 2*a,* 2*b,* and 2*c* show an example of a control sequence for the switches constituted by the transistors 7, which sequence is made up of squarewave signals issued by the control unit. The signals A, B, and C shown in these three figures are control signals for those of the transistors 7 in the bridge 2 which are connected to ground. The signals A', B', and C' which control the other transistors, i.e. those connected to the battery, are signals that are inverted relative to the signals A, B, and C, without overlapping them.

Figure 2D:

This is shown in FIG. 2*d* where the signal C' is drawn for controlling the transistor connected to the transistor controlled by the signal C.

With this kind of control, the rotor 4 performs one full revolution while each of the phases goes through a number of periods equal to the number of pairs of poles of the rotor (e.g. eight).

This motor operation is used for driving the engine of the vehicle in order to start it, thereby making it possible, in comparison with conventional vehicles, to eliminate the starter and the associated drive ring, and also the power cabling generally associated with the starter.

To enable the engine to be started in this way, the control signals for the transistors 7 are advantageously variable frequency signals, at a frequency which is regulated to be increasing by the unit 3, so as to avoid any slip of the rotor 4 relative to the rotating magnetic field created by the stator 5.

By way of example, frequency regulation may be defined by the unit 3 in such a manner as to guarantee that the alternator has a speed profile enabling the engine to be started.

In accordance with the invention, the control unit 3 includes means for recognizing a code signal that authorizes engine starting. This signal is transmitted to the unit 3 by code transmitter means inside the vehicle. The unit 3 switches on the transistors 7 in a manner suitable for starting the engine only if it receives the code signal. Consequently, the control unit 3 and the code transmitter means which transmit the unlocking signal to said unit constitute a system for immobilizing the engine.

By way of example, the code transmitter means are constituted by a transmitter unit connected to a numerical keypad situated on the dashboard of the vehicle, and via which the driver keys in the code prior to turning the key 11 of the vehicle to control starting of the engine.

In a variant, the code transmitter means may be constituted by a unit to which the unlocking code is transmitted by radio from a remote control unit actuated by the driver, e.g. on opening the doors.

Immediately after the engine has started, the unit 3 controls the transistors 7 so as to operate in alternator mode.

To this end, in an implementation of the invention, the unit 3 controls the transistors 7 so that all of them are open circuit across the terminals of all of the diodes.

The bridge 2 then reverts to being a conventional rectifier bridge.

In another possible embodiment, the transistors 7 are controlled so as to short circuit the conductive diodes. They are caused to be open circuit only across the terminals of non-conductive diodes.

Thus, a current no longer passes through the conductive diodes, such that the short circuits made in this way serve to reduce losses.

To synchronize control of the transistors 7 relative to the switching from the conductive state to the non-conductive state of the diodes 6, the unit 3 is connected to means for detecting when the diodes 6 pass from one state to another. By way of example, these means may be constituted by a sensor, such as a Hall effect sensor, for measuring the angular position of the rotor 4 relative to the stator 5.

Such a sensor may also be used for determining the speed of the rotor, e.g. by counting pulses in a given time window, so as to enable the unit 3 to detect that the engine has started and thus switch from operating in motor mode to operating in generator mode.

Also, and in a manner that is likewise known, means 9 are provided for regulating voltage so as to maintain the battery voltage at a suitable level.

Provision is also made for a switch 10, e.g. another MOSFET type switch, whose ON or OFF state is controlled by the control unit 3. This switch 10 is designed to short circuit the regulator in motor mode so that the secondary magnetic circuit 5 is then directly excited by the battery voltage.

I claim:

1. A self-propelled vehicle alternator used both as a generator and as an electric motor for starting the engine of the vehicle, the alternator comprising a coil-carrying rotor and a multiphase stator connected to a bridge of diodes and of switches for rectifying and controlling said phases, together with a control unit for controlling said switches, wherein the control unit recognizes a code signal transmitted by a code transmitter associated with the vehicle, said control unit controlling the phases of the stator for the purpose of causing the alternator to act as an electric motor and start the engine only if it receives a code signal from said code transmitter authorizing such starting.

2. An alternator according to claim 1, wherein the switches are MOSFET transistors including the diodes.

3. An alternator according to claim 1, including a sensor for measuring the angular position of the rotor.

4. An alternator according to claim 3, wherein the control unit also includes means operable, in a given time window to count the number of revolutions of the rotor and to detect therefrom that the engine has started.

5. An alternator according to claim 1, wherein the code transmitter serves as an arming device, and wherein a separate switch is provided for transmitting a start signal to the control unit once the code transmitter has armed the system.

* * * * *